(12) United States Patent
Tian et al.

(10) Patent No.: US 9,412,020 B2
(45) Date of Patent: Aug. 9, 2016

(54) GEOMETRIC CODING FOR BILLION-SCALE PARTIAL-DUPLICATE IMAGE SEARCH

(71) Applicant: Board of Regents of the University of Texas System, Austin, TX (US)

(72) Inventors: Qi Tian, Helotes, TX (US); Wengang Zhou, Hefei (CN); Houqiang Li, Hefei (CN); Yijuan Lu, San Marcos, TX (US)

(73) Assignees: Board of Regents of the University of Texas System, Austin, TX (US); Texas State University, San Marcos, TX (US); University of Science and Technology of China, Anhui (CN)

( * ) Notice: Subject to any disclaimer, the term of this patent is extended or adjusted under 35 U.S.C. 154(b) by 0 days.

(21) Appl. No.: 14/357,376

(22) PCT Filed: Nov. 9, 2012

(86) PCT No.: PCT/US2012/064493
§ 371 (c)(1),
(2) Date: May 9, 2014

(87) PCT Pub. No.: WO2013/071141
PCT Pub. Date: May 16, 2013

(65) Prior Publication Data
US 2014/0314324 A1   Oct. 23, 2014

Related U.S. Application Data

(60) Provisional application No. 61/557,715, filed on Nov. 9, 2011.

(51) Int. Cl.
*G06K 9/36* (2006.01)
*G06K 9/00* (2006.01)
(Continued)

(52) U.S. Cl.
CPC ...... *G06K 9/00523* (2013.01); *G06F 17/30247* (2013.01); *G06K 9/4671* (2013.01); *G06K 9/4676* (2013.01)

(58) Field of Classification Search
CPC ...... G06T 7/0083; G06T 7/0085; G06K 9/48; G06K 9/481; G06K 9/6206; G06K 9/00523; G06K 9/4676; G06K 9/4671; G06F 17/30247
USPC ......... 382/197, 181, 224, 276, 305, 190, 195, 382/201, 168, 170, 228, 209, 232, 251, 382/253; 707/687, 723, 705, 722, E17.024, 707/E17.022, E17.026, E17.02, 763, 748, 707/749, 692
See application file for complete search history.

(56) References Cited

U.S. PATENT DOCUMENTS 6,711,293 B1   3/2004   Lowe
6,834,288 B2   12/2004   Chen et al.
(Continued)

FOREIGN PATENT DOCUMENTS

KR   10-2006-0030085   4/2006

OTHER PUBLICATIONS

International Search Report/Written Opinion for PCT Application No. PCT/US2012/064493 issued Mar. 4, 2013.
(Continued)

*Primary Examiner* — Sheela C Chawan
(74) *Attorney, Agent, or Firm* — Meyertons, Hood, Kivlin, Kowert & Goetzel, P.C.; Eric B. Meyertons

(57) ABSTRACT

Most of large-scale image retrieval systems are based on Bag-of-Visual-Words model. However, traditional Bag-of-Visual-Words model does not well capture the geometric context among local features in images, which plays an important role in image retrieval. In order to fully explore geometric context of all visual words in images, efficient global geometric verification methods have been attracting lots of attention. Unfortunately, current existing global geometric verification methods are either computationally expensive to ensure real-time response. To solve the above problems, a novel geometric coding algorithm is used to encode the spatial context among local features for large scale partial duplicate image retrieval. With geometric square coding and geometric fan coding, our geometric coding scheme encodes the spatial relationships of local features into three geo-maps, which are used for global verification to remove spatially inconsistent matches. This approach is not only computationally efficient, but also effective in detecting duplicate images with rotation, scale changes, occlusion, and background clutter.

12 Claims, 7 Drawing Sheets

Figure 1:
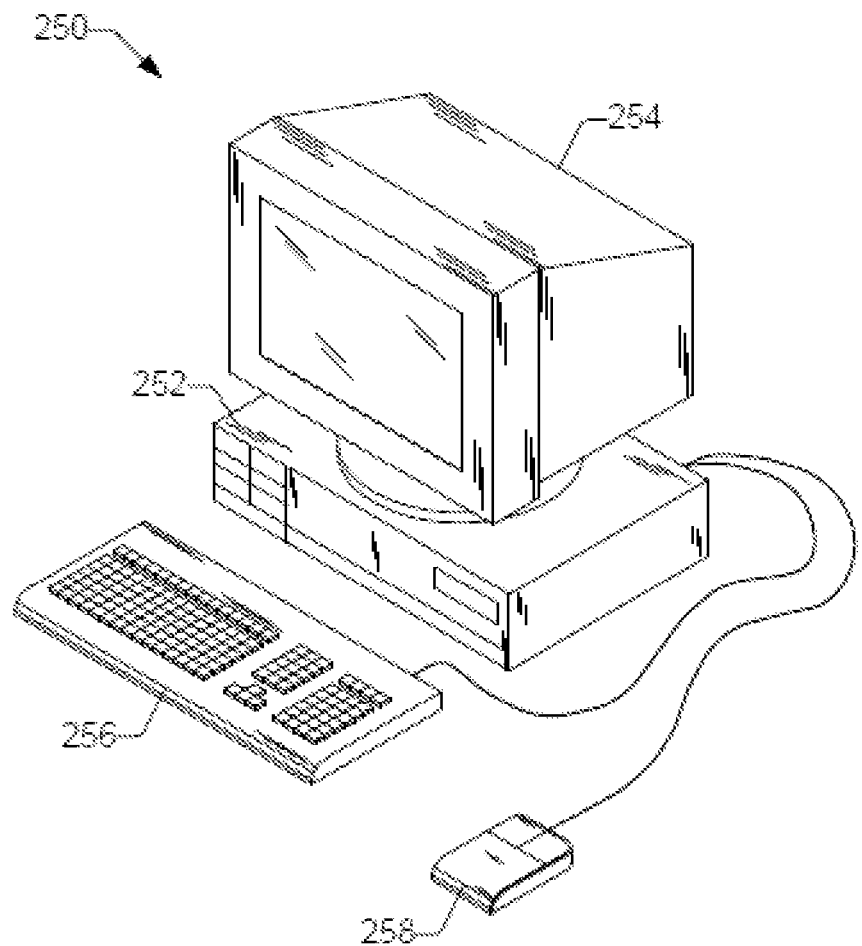

(51) Int. Cl.
*G06F 17/30* (2006.01)
*G06K 9/46* (2006.01)

(56) References Cited

U.S. PATENT DOCUMENTS

| | | | |
|---|---|---|---|
| 7,110,603 B2 * | 9/2006 | Lee et al. | 382/209 |
| 7,725,484 B2 | 5/2010 | Nister et al. | |
| 8,520,981 B2 * | 8/2013 | Akiyama | 382/305 |
| 8,705,876 B2 * | 4/2014 | Vaddadi et al. | 382/225 |
| 8,897,572 B2 * | 11/2014 | Hamsici et al. | 382/195 |
| 2009/0322875 A1 | 12/2009 | Toyoshima et al. | |
| 2010/0036818 A1 | 2/2010 | Valencia-Campo et al. | |
| 2010/0088295 A1 | 4/2010 | Duan et al. | |
| 2010/0195914 A1 | 8/2010 | Isard et al. | |
| 2010/0211602 A1 | 8/2010 | Menon et al. | |
| 2010/0239172 A1 | 9/2010 | Akiyama | |
| 2011/0029561 A1 | 2/2011 | Slaney et al. | |
| 2011/0182525 A1 | 7/2011 | Fukuhara | |
| 2011/0229045 A1 | 9/2011 | Yu | |
| 2013/0039566 A1 * | 2/2013 | Reznick et al. | 382/154 |

OTHER PUBLICATIONS

International Preliminary Report on Patentability for PCT Application No. PCT/US2012/064493 issued Mar. 4, 2013.
Fischler et al "Random sample consensus: a paradigm for model fitting with applications to image analysis and automated cartography" Communications of the ACM, 24(6), 381-395 (1981).
Kang et al. "Secure SIFT-Based Sparse Representation for Image Copy Detection and Recognition" Multimedia and Expo (ICME), Jul. 2010, IEEE International Conference. p. 1248-1253.
Lowe "Distinctive image features from scale-invariant keypoints." International journal of computer vision 60, No. 2 (2004): 91-110.
Nister et al. "Scalable recognition with a vocabulary tree." In Computer Vision and Pattern Recognition, 2006 IEEE Computer Society Conference on, vol. 2, pp. 2161-2168. IEEE, 2006.
Philbin et al. "Object retrieval with large vocabularies and fast spatial matching." In Computer Vision and Pattern Recognition, 2007. CVPR'07. IEEE Conference on, pp. 1-8. IEEE, 2007.
Sivic et al. "Video Google: A text retrieval approach to object matching in videos." In Computer Vision, 2003. Proceedings. Ninth IEEE International Conference on, pp. 1470-1477. IEEE, 2003.
Xu et al. "Near Duplicate Image Identification with Spatially Aligned Pyramid Matching" In Computer Vision and Pattern Recognition, 2008. CVPR 2008. IEEE Conference on, pp. 1-7. IEEE, 2008.
Zhang et al. "Descriptive Visual Words and Visual Phrases for Image Applications" Proceedings of the 17th ACM international conference on Multimedia. ACM, 2009.
Zhou et al. "Large Scale Partial-Duplicate Retrieval with Bi-Space Quantization and Geometric Consistency" 2010 IEEE International Conference on Acoustics, Speech, and Signal Processing, Proceedings, Mar. 2010, p. 2394-2397.
Zhou et al. "Large Scale Partially Duplicated Web Image Retrieval" In Proceedings of the international conference on Multimedia, pp. 1523-1524. ACM, Oct. 25-29, 2010.
Zhou et al. "Spatial Coding for Large Scale Partial-Duplicate Web Image Search" In Proceedings of the international conference on Multimedia (pp. 511-520). ACM, Oct. 25-29, 2010.

* cited by examiner

GEOMETRIC CODING FOR BILLION-SCALE PARTIAL-DUPLICATE IMAGE SEARCH

BACKGROUND OF THE INVENTION

1. Field of the Invention

The invention generally relates to systems and methods for analyzing digital images.

2. Description of the Relevant Art

Due to the convenience of assisted image editing tools, partially duplicated images are prevalent on the web. Partial-duplicate web images are usually obtained by editing the original 2D image with changes in color, scale, rotation, partial occlusion, etc. Partial duplicates exhibit different appearance but still share some duplicated patches. There are many applications of such a system to detect such duplicates, for instance, finding out where an image is derived from and getting more information about it, tracking the appearance of an image online, detecting image copyright violation, discovering modified or edited versions of an image, and so on.

In image-based object retrieval, the main challenge is image variation due to 3D view-point change, illumination change, or object-class variability. Partial-duplicate web image retrieval differs in that the target images are usually obtained by editing the original image with changes in color, scale, partial occlusion, etc. In partial-duplicate web images, different parts are often cropped from the original image and pasted in the target image with modifications. The result is a partial-duplicate version of the original image with different appearance but still sharing some duplicated patches.

In large scale image retrieval systems, the state-of-the-art approaches leverage scalable textual retrieval techniques for image search. Similar to text words in information retrieval, local SIFT descriptors are quantized to visual words. Inverted file indexing is then applied to index images via the contained visual words. However, the discriminative power of visual words is far less than that of text words due to quantization. And with the increasing size of image database (e.g. greater than one million images) to be indexed, the discriminative power of visual words decreases sharply. Visual words usually suffer from the dilemma of discrimination and ambiguity. On one hand, if the size of visual word codebook is large enough, the ambiguity of features is mitigated and different features can be easily distinguished from each other. However, similar descriptors polluted by noise may be quantized to different visual words. On the other hand, the variation of similar descriptors is diluted when using a small visual codebook. Therefore, different descriptors may be quantized to the same visual word and cannot be discriminated from each other.

Unlike text words in information retrieval, the geometric relationship among visual words plays a very important role in identifying images. Geometric verification has become very popular recently as an important post-processing step to improve the retrieval precision. However, due to the expensive computational cost of full geometric verification, it is usually only applied to some top-ranked candidate images. In web image retrieval, however, the number of potential candidates may be very large. Therefore, it may be insufficient to apply full geometric verification to the top-ranked images for sound recall.

Above all, based on the Bag-of-Visual-Words model, image retrieval mainly relies on improving the discrimination of visual words by reducing feature quantization loss and embedding geometric consistency. The expectation of real-time performance on large scale image databases forces researchers to trade off feature quantization and geometric constraints. Quantization of local features in previous work mainly relies on SIFT descriptor, resulting in limited efficiency while geometric verification is too complex to ensure real-time response.

SUMMARY OF THE INVENTION

To solve the above problems, a novel geometric coding algorithm is used to encode the spatial context among local features for large scale partial duplicate image retrieval. With geometric square coding and geometric fan coding, the described geometric coding scheme encodes the spatial relationships of local features into three geo-maps, which are used for global verification to remove spatially inconsistent matches. This approach is not only computationally efficient, but also effective in detecting duplicate images with rotation, scale changes, occlusion, and background clutter.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The embodiments described herein relate, generally, to systems and methods for analyzing digital images. FIG. 1 illustrates an embodiment of computer system 250 that may be suitable for implementing various embodiments of a system and method for analyzing digital images. Each computer system 250 typically includes components such as CPU 252 with an associated memory medium such as disks 260. The memory medium may store program instructions for computer programs. The program instructions may be executable by CPU 252. Computer system 250 may further include a display device such as monitor 254, an alphanumeric input device such as keyboard 256, and a directional input device such as mouse 258. Computer system 250 may be operable to execute the computer programs to implement computer-implemented systems and methods for processing claims.

Computer system 250 may include a memory medium on which computer programs according to various embodiments may be stored. The term "memory medium" is intended to include an installation medium, e.g., a CD-ROM, a computer system memory such as DRAM, SRAM, EDO RAM, Rambus RAM, etc., or a non-volatile memory such as a magnetic media, e.g., a hard drive or optical storage. The memory medium may also include other types of memory or combinations thereof. In addition, the memory medium may be located in a first computer, which executes the programs or may be located in a second different computer, which connects to the first computer over a network. In the latter instance, the second computer may provide the program instructions to the first computer for execution. Computer system 250 may take various forms such as a personal computer system, mainframe computer system, workstation, network appliance, Internet appliance, personal digital assistant ("PDA"), television system or other device. In general, the term "computer system" may refer to any device having a processor that executes instructions from a memory medium.

The memory medium may store a software program or programs operable to implement a method for processing digital images. The software program(s) may be implemented in various ways, including, but not limited to, procedure-based techniques, component-based techniques, and/or object-oriented techniques, among others. For example, the software programs may be implemented using C#, ASP.NET, HTML, JavaScript, Java, ActiveX controls, C++ objects, JavaBeans, Microsoft Foundation Classes ("MFC"), browser-based applications (e.g., Java applets), traditional programs, or other technologies or methodologies, as desired. A CPU such as host CPU 252 executing code and data from the memory medium may include a means for creating and executing the software program or programs according to the embodiments described herein.

Figure 2:
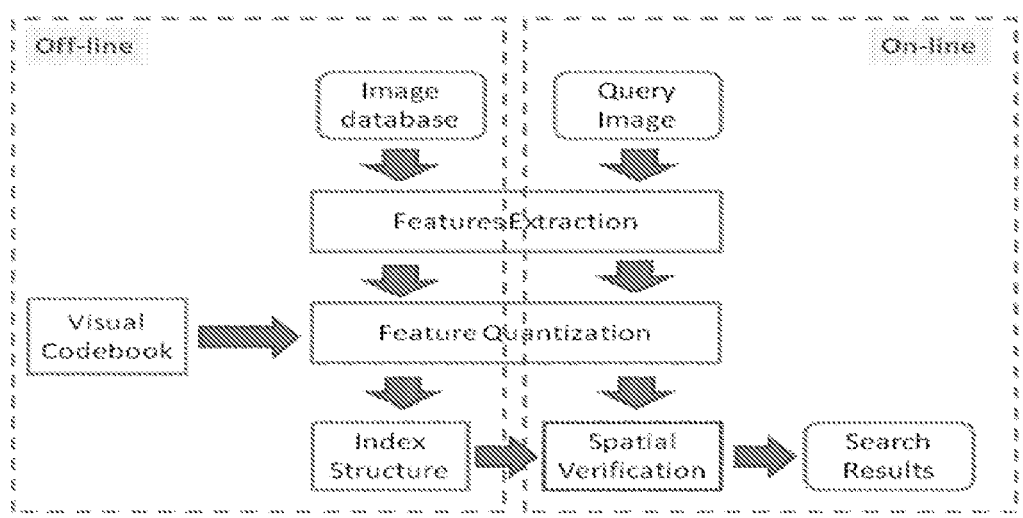

The general framework on an embodiment of an image content-based image search is illustrated in FIG. 2. The method includes an off-line component and an on-line component. The off-line component will index all database images into an inverted file structure, while the on-line component retrieves relevant images to the query image from the inverted file structure. Both components share the same "feature extraction" sub-component and "feature quantization" sub-component. The feature quantization is involved with a visual codebook, which is learned off-line beforehand. Generally, after obtaining the initial relevant images from the index structure, spatial verification is adopted to filter noisy results, before returning the final search results to users.

In one embodiment, the spatial verification is performed by geometric coding. Relative geometric relationships among local features are encoded into geo-maps. Verification of local matches between images is achieved by comparing the geo-maps of two images. This general approach can effectively identify noisy images and, thus the computational cost is very low, which is very useful for large-scale image searches.

Generally, the SIFT feature is used for Feature Extraction. SIFT features may be determined according to the methods described in Sivic, J. and Zisserman, A. 2003. Video Google: A text retrieval approach to object matching in videos. In Proc. ICCV.; Lowe, 2004. D. Distinctive image features from scale-invariant key points. In IJCV, 60(2): 91-110; and U.S. Pat. No. 6,711,293; all of which are incorporated herein by reference. In the method, the SIFT descriptor is initially applied for vector quantization. The key point location, orientation and scale of SIFT feature are exploited for generation of geometric coding maps. Next, spatial verification is performed with those geometric coding maps. Finally an inverted file structure is used to index large scale images.

1. Feature Quantization

Images are indexed on a large scale with an inverted index file structure for retrieval. Before indexing, SIFT features are quantized to visual words based on the Bag-of-Visual-Words model. A quantizer is defined to map a SIFT descriptor to a visual word. The quantizer may be generated by clustering a sample set of SIFT descriptors and the resulting cluster centroids are regarded as visual words. During the quantization stage, a novel feature will be assigned to the index of the closest visual words. In our implementation, the hierarchical visual vocabulary tree approach is used for visual vocabulary generation and feature quantization. The hierarchical visual vocabulary tree approach is described in Nister, D. and Stewenius, H. 2006. Scalable recognition with a vocabulary tree. In Proc. CVPR, pages 2161-2168, which is incorporated herein by reference. With feature quantization, any two features from two different images quantized to the same visual word will be considered as a local match across the two images.

2. Geometric Coding

Rotating the

The spatial context among local features of an image is critical in identifying duplicate image patches. After SIFT quantization, SIFT matches between two images can be obtained. However, due to quantization error and visual word ambiguity, the matching results are usually polluted by some false matches. Generally, geometric verification can be adopted to refine the matching results by discovering the transformation and filtering false positives. Since full geometric verification with RANSAC is computationally expensive, it is usually only used as a post-processing stage to process some initially top-ranked candidate images. More efficient schemes to encode the spatial relationships of visual words are desired.

Geometric coding is used to encode the geometric context of local SIFT features for spatial consistency verification. In one embodiment, geometric coding is composed of two types of coding strategies—geometric square coding and geometric fan coding. The difference between the two strategies lies in the way the image plane is divided according to an invariant reference feature. Before encoding, the image is divided with a certain criterion that can address both rotation-invariance and scale-invariance. This criterion is determined via the intrinsic invariance merit of SIFT feature.

Figure 3A:
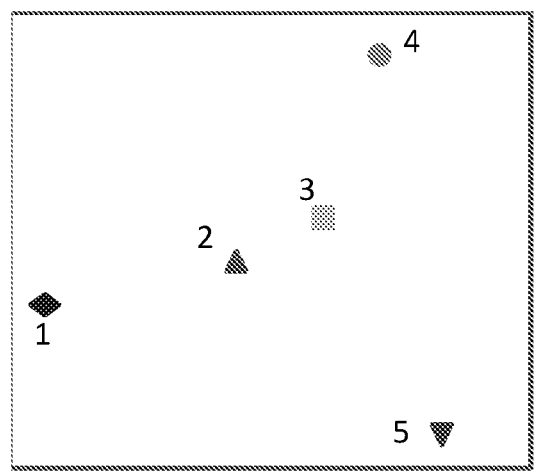
Figure 3B:
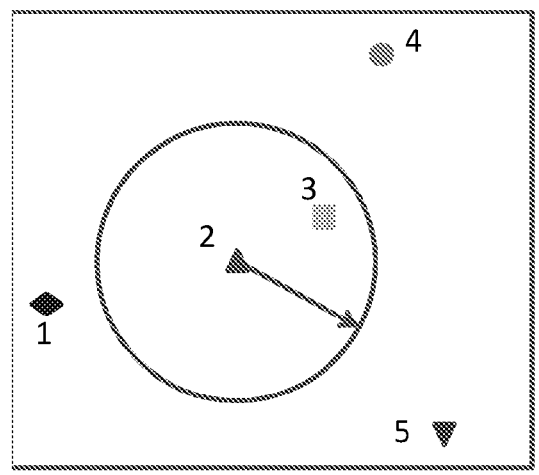
Figure 3C:
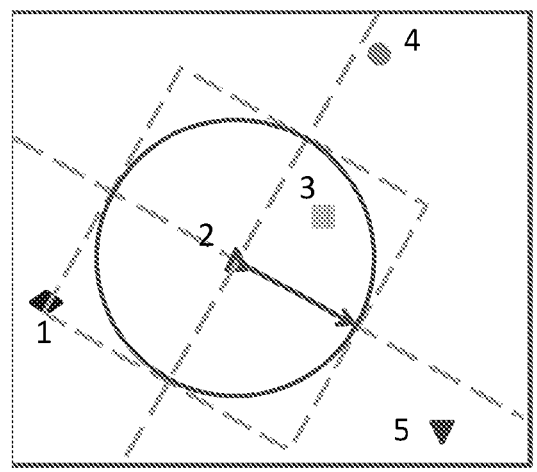
Figure 3D:
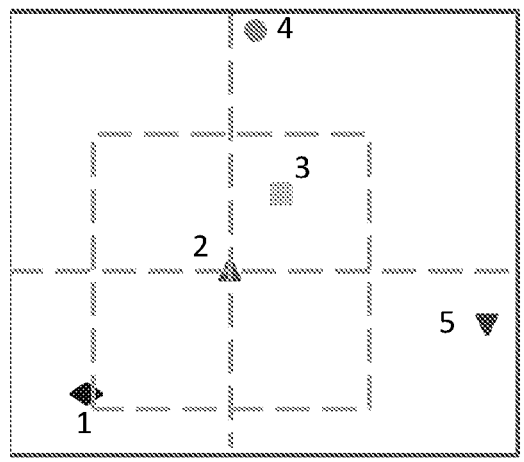
Figure 3E:
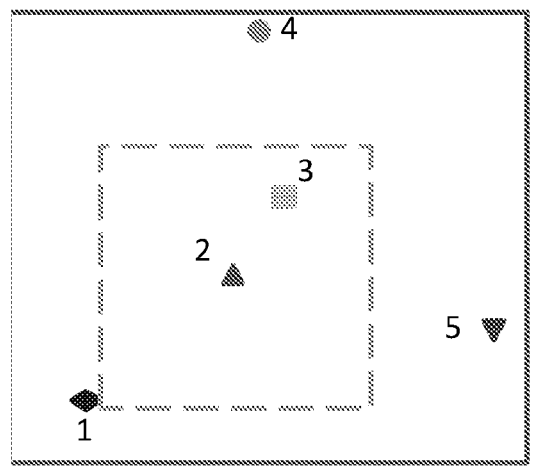
Figure 3F:
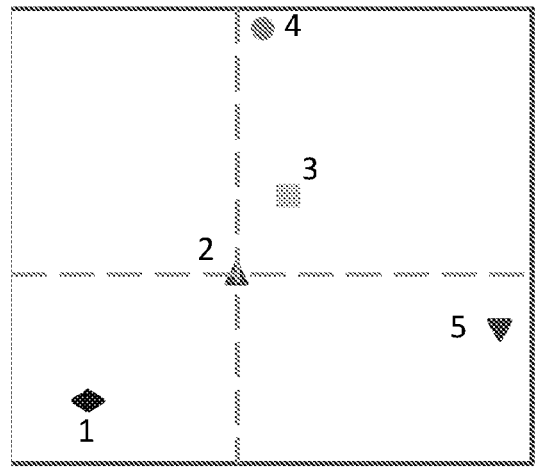

FIG. 3A gives a toy example of image plane division with feature 2 as reference point. FIG. 3B illustrates an arrow originated from feature 2, which corresponds to a vector indicating the scale and orientation of the SIFT feature. Using feature 2 as origin and direction of the arrow as major direction, two lines horizontal and vertical to the arrow of feature 2 are drawn. Besides, centered at feature 2, a square is also drawn along these two lines, as shown in FIG. 3C. For comparison convenience, the locations of all features are rotated to align the arrow to be horizontal, as shown in FIG. 3D. After that, the image plane division with the two lines and the square can be decomposed into two kinds of sub-divisions, as shown in FIGS. 3E and 3F, which will be used for geometric square coding and geometric fan coding, respectively. The details are discussed in the following two sub-sections.

2.1 Geometric Square Coding

Geometric square coding (GSC) encodes the geometric context in axial direction of reference features. In GSC, with each SIFT feature as reference center, the image plane is divided by regular squares. A square coding map, called S-map, is constructed by checking whether other features are inside or outside of the square.

To achieve rotation-invariant representation, before checking relative position, we have to adjust the location of each SIFT feature according to the SIFT orientation of each reference feature. For instance, given an image I with M features $\{f_i(x_i,y_i)\}$, (i=1, 2, . . . , M), with feature $f_i(x_i,y_i)$ as reference point, the adjusted position $f_j^{(i)}(x_j^{(i)}, y_j^{(i)})$ of $f_j(x_j,y_j)$ is formulated as follows:

$$\begin{pmatrix} x_j^{(i)} \\ y_j^{(i)} \end{pmatrix} = \begin{pmatrix} \cos(\phi_i) & -\sin(\phi_i) \\ \sin(\phi_i) & \cos(\phi_i) \end{pmatrix} \cdot \begin{pmatrix} x_j \\ y_j \end{pmatrix}, \quad (1)$$

$$0 \le i, j < M$$

where $\phi_i$ is a rotation angle equal to the SIFT orientation of the reference feature $f_i$.

S-map describes whether other features are inside or outside of a square defined by the reference feature. For image I, its S-map is defined as:

$$Smap(i, j) = \begin{cases} 1 & \text{if } \max(|x_j^{(i)} - x_i^{(i)}|, |y_j^{(i)} - y_i^{(i)}|) < s_i \\ 0 & \text{otherwise} \end{cases} \quad (2)$$

where $s_i$ is a half-square-length proportional to SIFT scale of feature $f_i$: $s_i = \alpha \cdot scl_i$, $\alpha$ is a constant.

To more strictly describe the relative positions, we advance to general squared maps. For each feature, n squares are drawn, with an equally incremental step of the half side length on the image plane. Then, the image plane is divided into (n+1) non-overlapping parts. Correspondingly, according to the image plane division, a generalized geo-map should encode the relative spatial positions of feature pairs. The general S-map is defined as follows:

$$GS(i, j) = \frac{\max(|x_j^{(i)} - x_i^{(i)}|, |y_j^{(i)} - y_i^{(i)}|)}{s_i} \quad (3)$$

where $s_i$ is the same as that in Eq. (2), k=1, 2, ..., r.

Intuitively, a ring or circle may be selected for image plane division. In such a case, there is no need to adjust the coordinates of local features. The corresponding geometric map is defined as GR, which is formulated as:

$$GR(i, j) = \left\lfloor \frac{d_{i,j}}{s_i} \right\rfloor \quad (4)$$

where $\lfloor x \rfloor$ denotes the nearest integer less than or equal to x, $d_{i,j} = \sqrt{(x_i - x_j)^2 + (y_i - y_j)^2}$, $s_i = \alpha \cdot scl_i$, $scl_i$ is the scale parameter of SIFT feature $v_i$, $\alpha$ is a constant, k=1, 2, ..., r.

Although similar results can be expected with GS and GR, square in GSC fits the image shape (i.e., rectangle) better than circles or rings. In some embodiments, GS as defined in Eq. (3) was selected instead of GR for geometric verification.

2.2 Geometric Fan Coding

Geometric square coding only considers the relative spatial position in radial direction, and ignores the constraints along horizontal and vertical direction. To overcome that drawback, geometric fan coding (GFC) may be used. In geometric fan coding, each SIFT feature is taken as a reference point and the image plane is divided into some regular fan regions. Two fan coding maps, e.g., H-map and V-map, may be constructed by checking which fan region other features fall into.

Geometric fan coding encodes the relative spatial positions between each pair of features in an image. Based on the adjusted new positions of SIFT feature in Eq. (1), two binary geometric maps, called H-map and V-map, are generated. H-map and V-map describe the relative spatial positions between each feature pair along the horizontal and vertical directions, respectively. They are formulated as follows:

$$Hmap(i, j) = \begin{cases} 0 & \text{if } x_j^{(i)} \leq x_i^{(i)} \\ 1 & \text{if } x_j^{(i)} > x_i^{(i)} \end{cases} \quad (5)$$

$$Vmap(i, j) = \begin{cases} 0 & \text{if } y_j^{(i)} \leq y_i^{(i)} \\ 1 & \text{if } y_j^{(i)} > y_i^{(i)} \end{cases} \quad (6)$$

The geometric maps can be interpreted as follows. In row i, feature $f_i$ is selected as the reference point, and the image plane is decomposed into four quadrants along horizontal and vertical directions. H-map and V-map then show which quadrant other features fall into.

In fact, the representation of geometric context among local features with H-map and V-map is still too weak. We can put forward the geometric fan coding to more general formulations, so as to impose stricter geometric constraints. The image plane can be divided into 4·r parts, with each quadrant evenly divided into r fan regions. Accordingly, two general fan coding maps GH and GV are required to encode the relative spatial positions of all SIFT features in an image.

For a division of image plane into 4·r parts, we decompose the division into r independent sub-divisions, each uniformly dividing the image plane into four quadrants. Each sub-division is then encoded independently and their combination leads to the final fan coding maps. In each subdivision, to encode the spatial context of all features by the left-right and below-above comparison, we just need to rotate all the feature coordinates and the division lines counterclockwise, until the two division lines become horizontal and vertical, respectively.

The general fan coding maps GH and GV are both 3-D and defined as follows. Specially, with feature $f_i$ as reference, the location of feature $f_j$ is rotated counterclockwise by $$\theta_i^{(k)} = \frac{k \cdot \pi}{2 \cdot r} + \phi_i$$

degree (k=0, 1, ..., r-1) according to the image origin point, yielding the new location $f_j^{(i,k)}(x_j^{(i,k)}, y_j^{(i,k)})$ as, $$\begin{pmatrix} x_j^{(i,k)} \\ y_j^{(i,k)} \end{pmatrix} = \begin{pmatrix} \cos(\theta_i^{(k)}) & -\sin(\theta_i^{(k)}) \\ \sin(\theta_i^{(k)}) & \cos(\theta_i^{(k)}) \end{pmatrix} \cdot \begin{pmatrix} x_j \\ y_j \end{pmatrix} \quad (7)$$

$\phi_i$ is the SIFT orientation angle of $f_i$, as used in Eq. (1). Then GH and GV are formulated as:

$$GH(i, j, k) = \begin{cases} 0 & \text{if } x_j^{(i,k)} \leq x_i^{(i,k)} \\ 1 & \text{if } x_j^{(i,k)} > x_i^{(i,k)} \end{cases} \quad (8)$$

$$GV(i, j, k) = \begin{cases} 0 & \text{if } y_j^{(i,k)} \leq y_i^{(i,k)} \\ 1 & \text{if } y_j^{(i,k)} > y_i^{(i,k)} \end{cases} \quad (9)$$

In geometric fan coding, the factor r controls the strictness of geometric constraints and will affect verification performance.

If the partial-duplicate patches in a query image and its target image undergo no rotation changes, $\phi_i$ in Eq. (1) can be set to zero. Under such a condition, the geometric fan coding degenerates into our spatial coding scheme, which is more concise.

From the discussion above, it can be seen that, both geometric square coding and geometric fan coding can be efficiently performed. However, it will take considerable memory to store the whole geometric maps of all features in an image. Fortunately, that is not necessary at all. Instead, we only need keep the orientation, scale, x- and y-coordinate of each SIFT feature, respectively. When checking the feature matching of two images, we just need geometric clues of these SIFT matches, which will be employed to generate geometric maps for spatial verification in real time. Since the SIFT matches are usually only a small set of the whole feature set of an image, the corresponding memory cost on these geometric coding maps is relatively low. The details are discussed in the next section.

3. Spatial Verification

Since the focused problem is partial-duplicate image retrieval, there is an underlying assumption that the target image and the query image share some duplicated patches, or in other words, share some local features with consistent geometry. Due to the unavoidable quantization error and visual word ambiguity, there always exist some false SIFT matches, which will interfere image similarity measure. To more accurately define the similarity between images, spatial verification with geometric coding can be used to remove such false matches.

Denote that a query image $I_q$ and a matched image $I_m$ are found to share N matching pairs of local features. Then the geo-maps of these matched features for both $I_q$ and $I_m$ can be generated and denoted as $(GS_q, GH_q, GV_q)$ and $(GS_m, GH_m, GV_m)$ by Eq. (3), Eq. (8) and Eq. (9), respectively. After that, we can compare these geometric maps to remove false matches as follows.

Since the general geometric fan coding maps are binary, for efficient comparison, we perform logical Exclusive-OR (XOR) operation on $GH_q$ and $GH_m$, $GV_q$ and $GV_m$, respectively:

$$V_H(i,j,k) = GH_q(i,j,k) \oplus GH_m(i,j,k) \quad (10)$$

$$V_V(i,j,k) = GV_q(i,j,k) \oplus GV_m(i,j,k) \quad (11)$$

Ideally, if all N matched pairs are true, $V_H$ and $V_V$ will be zero for all their entries. If some false matches exist, the entries of these false matches on $GH_q$ and $GH_m$ may be inconsistent, and so are that on $GV_q$ and $GV_m$. Those inconsistencies will cause the corresponding exclusive-OR result of $V_H$ and $V_V$ to be 1. We define the inconsistency from geometric fan coding as follows, $$F_H(i,j) = \bigcup_{k=1}^{r} V_H(i,j,k) \quad (12)$$

$$F_V(i,j) = \bigcup_{k=1}^{r} V_V(i,j,k) \quad (13)$$

The inconsistency from geometric square coding is defined as:

$$F_S(i,j) = |GS_q(i,j) - GS_m(i,j)| \quad (14)$$

Consequently, by checking $F_H$, $F_V$ and $F_S$, the false matches can be identified and removed. Denote:

$$T(i,j) = \begin{cases} 1 & \text{if } F_S(i,j) > \tau \text{ and } F_H(i,j) + F_V(i,j) > \beta \\ 0 & \text{otherwise} \end{cases} \quad (15)$$

where $\beta$ and $\tau$ are constant integers. When $\tau$ or $\beta$ is greater than zero, T in Eq. (15) can tolerate some drifting error of relative positions of local features.

Ideally, if all matched pairs are true positives, the entries in T will be all zeroes. If false matches exist, the entries of those false matches on those coding maps may be inconsistent. Those inconsistencies will cause the corresponding entries in T to be 1. We can iteratively remove such matches that cause the most inconsistency, until all remained matches are consistent to each other.

When two images both contain multiple partial-duplicated objects, each with different scale or orientation changes, the above manipulation will only discover the dominant duplicated objects with the most local matches. To address this problem, we shall first find those matches corresponding to the dominant duplicated object and then focus on the sub-geo-maps of the remaining matches. Those matches corresponding to the second dominant object can be identified in a similar way. Such operation can be performed iteratively, until all partial-duplicate objects are uncovered.

Figure 4A:
Figure 4B:
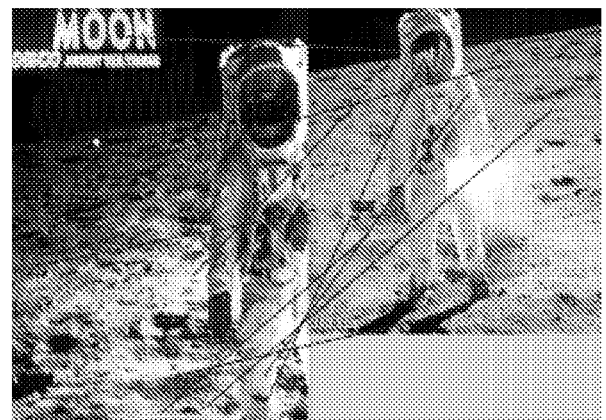
Figure 4C:
Figure 5A:
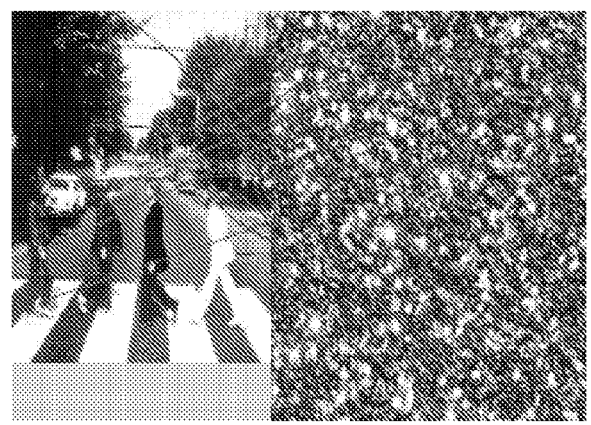
Figure 5B:
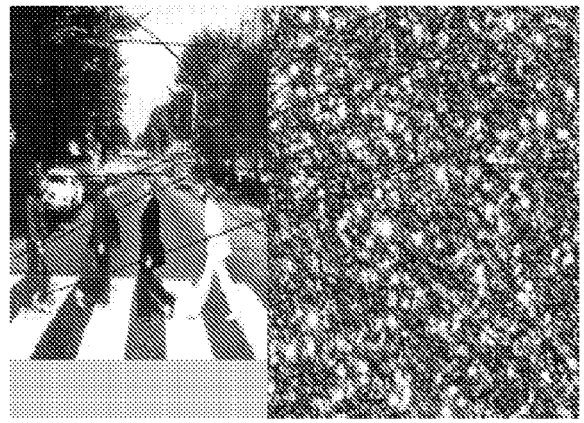
Figure 5C:
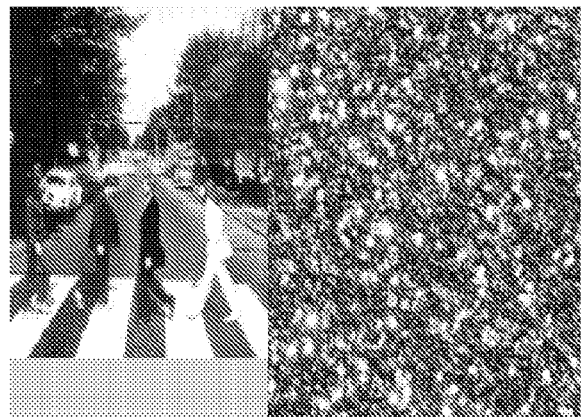

FIGS. 4 and 5 show two instances of the spatial verification with geometric coding on a relevant image pair (FIG. 4) and an irrelevant image pair (FIG. 5). Initially, both image pairs have many matches of local features (FIGS. 4A and 5A). In FIG. 4, after spatial verification via geometric coding, 9 false matches are identified and removed (FIG. 4B), while 12 true matches are satisfactorily kept (FIG. 4C). For FIG. 5, although they are irrelevant in content, 17 SIFT matches still exist after quantization (FIG. 5A). However, by spatial verification (FIG. 5B), only one pair of match is kept (FIG. 5C). With those false matches removed, the similarity between images can be more accurately defined and that will benefit retrieval accuracy. The philosophy behind the effectiveness of our geometric verification approach is that, the probability of two irrelevant images sharing many spatially consistent visual words is very low.

4. Indexing Structure

Figure 6:
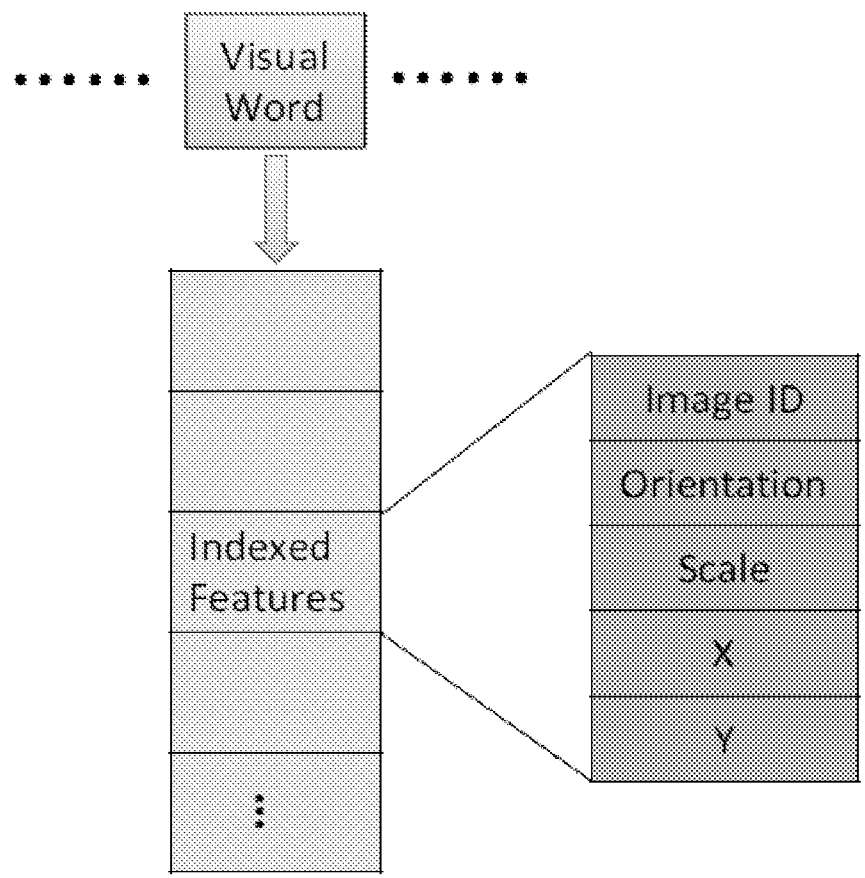

We use and inverted file structure to index images. As illustrated in FIG. 6, each visual word is followed by a list of indexed features that are quantized to the visual word. Each indexed feature records the ID of the image where the visual word appears. Besides, as discussed in Section 2, for each indexed feature, we also need keep its SIFT orientation, scale and the x- and y-coordinate, which will be used for generating geometric coding maps for retrieval.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of analyzing digital images comprising:
   extracting features from a first image and a second image;
   quantizing the extracted features by creating a feature vector;
   comparing the feature vectors of the first image with the feature vectors of the second image to determine matching pairs of feature vectors
   performing geometric coding to encode the relative spatial positions of the feature vectors, wherein performing geometric coding comprises forming a geo-map of the first image and a geo-map of the second image;
   performing spatial verification of one or more matching pairs of feature vectors using the determined relative spatial positions of the feature vectors, wherein performing spatial verification of one or more matching pairs of feature vectors comprises comparing the geo-map of the first image to the geo-map of the second image;
   removing false matching pairs of feature vectors between the first image and the second image based on the spatial verification; and
   comparing the remaining matching pairs of feature vectors to determine if the first image is the same as the second image.

2. The method of claim 1, wherein extracting features from the first and second images comprises generating scale invariant feature transform (SIFT) features for the digital images.

3. The method of claim 1, further comprising rotating the image to align the one of the feature vectors with a predetermined orientation.

4. The method of claim 1, wherein the geo-map of the first image and the geo-map of the second image are formed using geometric square coding.

5. The method of claim 4, wherein geometric square coding comprises dividing an image plane of an image into regular squares relative to a feature vector of the image and checking whether other feature vectors are inside or outside of the square.

6. The method of claim 1, wherein the geo-map of the first image and the geo-map of the second image are formed using geometric fan coding.

7. The method of claim 6, wherein geometric fan coding comprises dividing an image plane of an image into regular fan regions relative to a feature vector of the image and checking whether other feature vectors are inside or outside of the fan regions.

8. The method of claim 1, further comprising storing the quantized images as visual words, wherein a visual word comprises an orientation value, scale value, x-value, and y-value.

9. The method of claim 1, wherein the first digital image is stored in an image databases and wherein the second image is obtained from a web site.

10. A system, comprising:
    a processor;
    a memory coupled to the processor and configured to store program instructions executable by the processor to perform the method comprising:
        extracting features from a first image and a second image;
        quantizing the extracted features by creating a feature vector;
        comparing the feature vectors of the first image with the feature vectors of the second image to determine matching pairs of feature vectors
        performing geometric coding to encode the relative spatial positions of the feature vectors, wherein performing geometric coding comprises forming a geo-map of the first image and a geo-map of the second image;
        performing spatial verification of one or more matching pairs of feature vectors using the determined relative spatial positions of the feature vectors, wherein performing spatial verification of one or more matching pairs of feature vectors comprises comparing the geo-map of the first image to the geo-map of the second image;
        removing false matching pairs of feature vectors between the first image and the second image based on the spatial verification; and
        comparing the remaining matching pairs of feature vectors to determine if the first image is the same as the second image.

11. The system of claim 10, wherein the system further comprises:
    an off-line component, the offline component comprising a database of images;
    an on-line component, the online component configured to retrieve internet images to compare to the database of images;
    a feature extraction sub-component shared by the on-line component and the off-line component, wherein the feature extraction sub-component produces a reduced representation set of features, and wherein the sub-component produces the same feature extraction on the database images and the internet images; and
    a feature quantization sub-component shared by the on-line component and the off-line component, wherein the feature quantization sub-component quantizes the features into feature vectors.

12. A tangible, non-transitory computer readable storage medium comprising program instructions stored thereon, wherein the program instructions are computer-executable to perform the method comprising:
    extracting features from a first image and a second image;
    quantizing the extracted features by creating a feature vector;
    comparing the feature vectors of the first image with the feature vectors of the second image to determine matching pairs of feature vectors
    performing geometric coding to encode the relative spatial positions of the feature vectors, wherein performing geometric coding comprises forming a geo-map of the first image and a geo-map of the second image;
    performing spatial verification of one or more matching pairs of feature vectors using the determined relative spatial positions of the feature vectors, wherein performing spatial verification of one or more matching pairs of feature vectors comprises comparing the geo-map of the first image to the geo-map of the second image;
    removing false matching pairs of feature vectors between the first image and the second image based on the spatial verification; and
    comparing the remaining matching pairs of feature vectors to determine if the first image is the same as the second image.

* * * * *